(12) United States Patent
Bouwman et al.

(10) Patent No.: US 11,962,019 B2
(45) Date of Patent: Apr. 16, 2024

(54) CARBON BASED ELECTRODE WITH LARGE GEOMETRIC DIMENSIONS

(71) Applicant: VITO NV, Mol (BE)

(72) Inventors: Lambertus Bouwman, Mol (BE); Diana Van Houtven, Mol (BE); Deepak Pant, Mol (BE); Yolanda Alvarez Gallego, Mol (BE); Karolien Vanbroekhoven, Mol (BE)

(73) Assignee: VITO NV, Mol (BE)

( * ) Notice: Subject to any disclaimer, the term of this patent is extended or adjusted under 35 U.S.C. 154(b) by 494 days.

(21) Appl. No.: 16/753,027

(22) PCT Filed: Sep. 21, 2018

(86) PCT No.: PCT/EP2018/075646
§ 371 (c)(1),
(2) Date: Apr. 2, 2020

(87) PCT Pub. No.: WO2019/068488
PCT Pub. Date: Apr. 11, 2019

(65) Prior Publication Data
US 2020/0295381 A1    Sep. 17, 2020

(30) Foreign Application Priority Data

Oct. 3, 2017 (EP) .................................... 17194627
Jun. 5, 2018 (EP) .................................... 18176121

(51) Int. Cl.
*H01M 4/96* (2006.01)
*H01M 4/583* (2010.01)
(Continued)

(52) U.S. Cl.
CPC ............ *H01M 4/96* (2013.01); *H01M 4/8626* (2013.01); *H01M 8/16* (2013.01); *C02F 2201/46* (2013.01); *H01M 4/583* (2013.01)

(58) Field of Classification Search
CPC ........ H01M 4/96; H01M 4/8626; H01M 8/16; H01M 4/583; H01M 4/86; C02F 2201/46; Y02E 60/10; Y02E 60/50
See application file for complete search history.

(56) References Cited

U.S. PATENT DOCUMENTS 6,410,180 B1 *  6/2002  Cisar ...................... H01M 4/92
                                                    429/534
2003/0198853 A1 * 10/2003  Choi ................... H01M 8/0273
                                                    429/471

(Continued)

FOREIGN PATENT DOCUMENTS

WO   WO-2011052650 A1 *  5/2011   .............. H01M 4/92
WO       2016020453 A1    2/2016
WO       2017100845 A1    6/2017

*Primary Examiner* — Basia A Ridley
*Assistant Examiner* — Heng M. Chan
(74) *Attorney, Agent, or Firm* — Banner & Witcoff, Ltd.

(57) ABSTRACT

The present invention relates to a carbon based electrode with a large geometrical surface area comprising a frame of an electrically conductive material with several cut-outs with a surface area, which cut-outs are separated from each other by portions of the conductive material, wherein carbon based sub-electrodes dimensioned so as to a least cover the surface area of the cut-outs are positioned in the cut-outs and conductively connected to at least part of each of the portions of the conductive material adjacent to the carbon based sub-electrodes.

15 Claims, 6 Drawing Sheets

(51) Int. Cl.
*H01M 4/86* (2006.01)
*H01M 8/16* (2006.01)

(56) References Cited

U.S. PATENT DOCUMENTS

| | | | |
|---|---|---|---|
| 2004/0161659 A1* | 8/2004 | Lloyd | H01M 8/04126 |
| | | | 429/480 |
| 2008/0044718 A1 | 2/2008 | Wang et al. | |
| 2008/0297980 A1 | 12/2008 | Bourcier et al. | |
| 2016/0010227 A1* | 1/2016 | Pant | H01M 4/747 |
| | | | 204/284 |

* cited by examiner

CARBON BASED ELECTRODE WITH LARGE GEOMETRIC DIMENSIONS

RELATED APPLICATIONS

This application is a National Stage Application under 35 U.S.C. 371 of co-pending PCT application PCT/EP2018/075646 designating the United States and filed Sep. 21, 2018; which claims the benefit of EP application number 17194627.0 and filed Oct. 3, 2017 and EP application number 18176121.4 and filed Jun. 5, 2018 each of which are hereby incorporated by reference in their entireties.

The present invention relates to a carbon based electrode with an increased surface area as compared to existing carbon based electrodes, in particular a carbon based electrode with a geometric surface area that is larger when compared to existing carbon based electrodes.

Electrochemical reactions have attracted significant interest because the technique opens new possibilities for a more efficient use of resources and permits a direct transformation of electrical energy into chemical energy or vice versa, while reducing the production of waste heat. Besides this, reaction rate and selectivity may be controlled by adapting one or more of the electrode potential, catalyst, surface structure and concentration of one ore more reactants in the electrochemical cell. In electrochemical cells where a gaseous reactant is subjected to an oxidation or a reduction reaction, the porous gas diffusion electrode contained therein has been identified as a critical, but decisive component.

The industrial applicability of electrochemical conversion technologies has been found to largely depend on the exploitation scale. The availability of electrochemical reactors in sizeable dimensions and cost efficient designs is a basic requirement if economically feasible electrochemical conversion technologies are envisaged.

Electrochemical reactors may be constructed of a plurality of single electrochemical cells that are electrically connected, either in a unipolar or bipolar arrangement. In a bipolar arrangement, the bipolar plate connects electrically adjacent cells in series and electrons generated or consumed in the electrochemical reaction flow in the direction perpendicular to the plane of the electrode along the bipolar plate. The bipolar plate also connects the anode of one cell and the cathode of an adjacent cell. In a unipolar arrangement, all cathodes are electrically connected in parallel, and all anodes are electrically connected in parallel, and the entire assembly is immersed in a single electrolyte bath or tank.

Current unipolar carbon-based electrodes are typically composed of a layer of an electrochemically active material, in particular a catalytically active material arranged in a matrix of a porous active carbon material, which is usually applied on top of a porous electrically conductive current density distributor. The current density distributor often takes the form of a porous mesh. The current density distributor adds the required in-plane conductivity to the electrode in the direction along the direction of the major current flow, and may also add in-plane conductivity in cross direction of the major current flow. The current density distributor further provides mechanical and dimensional support to the electrochemically active layer of the electrode. Metal grids or meshes with a low electrical resistance made of a variety of alloys in a wide combination of thicknesses and open areas, are commercially available and typically used as current density distributor. A particular example of such a current density distributor developed by VITO is described in PCT application PCT/EP2014/053737.

Whereas electrochemical reactors containing electrodes with geometric dimensions in the order of 0.5 to 1 $m^2$ for example are largely available when the active surface of the electrode is metallic, applications of carbon based gas diffusion electrodes are in practice limited to the use of electrodes with a maximum size of a few hundreds of $cm^2$ per single cell. The processing of large volumes of reactants accordingly demands an arrangement in which a large number of single electrochemical cells each equipped with a gas diffusion electrode, are connected in the direction perpendicular to the plane of the electrode, which leads to unpractical requirements in terms of space and components.

Unfortunately, the production of large dimensioned carbon based electrodes is not self-evident. The porous carbon electrode material is namely brittle and fragile, and consequentially producing a large thin electrode sheet or plate requires special manufacturing techniques like casting or calendaring and a high degree of skill. Besides these challenges encountered already in the manufacturing of the gas diffusion electrode, simply increasing the size of the electrode presents further disadvantages, like mechanical weakness of the electrode and ohmic losses during operation.

Efforts to address the manufacturing limitations were primarily tailored around adaptations in the composition of the active layer, such as for example described in Japanese Patent publications JPH04169070, U.S. Pat. No. 4,777,083 and JPS63130791, but these solutions are not generally compatible and they depend on the nature of the active layer. The soldering of several plate shaped electrodes on top of a conductive geometrically large sized substrate as described in EP1229149A1 cannot be considered a suitable technique for use with carbon based electrodes, and certainly not for use with carbon based gas diffusion electrodes as neither of the two components—electrode or support plate—permit gas diffusion. In addition, the space between adjacent electrodes is of insulating nature, and the presence of the soldering material creates voltage potentials different from those already present in the electrode.

In JPH04169070 carbonaceous powders of two different particle sizes are mixed and used as the filler component for an adhesive, with the purpose of forming an adhesion layer in which conductive fine particles at the time of baking and carbonization, are contained inside a thermosetting resin. The viscosity of the adhesive should be kept between 500-5000 poises and the adhesive should be formed in a layer of 50-200 μm thick. The adhesion layer is joined to a porous carbonaceous electrode plate to be hardened under pressurization and heating and is baked and carbonized at 800° C. or more in a non-oxidizing atmosphere. However, this process for producing the electrode is harsh, energy consuming and as a consequence expensive.

From the foregoing it becomes evident that a carbon based electrode with larger geometric dimensions than known or used hitherto cannot simply be obtained by linear expansion of the size of existing carbon based electrodes.

It has accordingly become desirable, similar to geometrically large-sized thin plate metal electrodes, to provide carbon based electrodes with substantially larger geometric dimensions in length and width than known up to now. In an ideal situation the large electrodes should be suitable for use with both an anode and cathode in gas diffusion electrodes.

The present invention therefor seeks to solve the problem of providing a geometrically large-sized carbon based electrode, which is suitable for use with both an anode and cathode in gas diffusion electrodes.

This problem is solved according to this invention with a carbon based electrode which shows the technical features of the characterizing portion of the first claim.

Thereto, the present invention relates to a carbon based electrode with a large geometrical surface area. The electrode comprises a frame of a conductive material with several cut-outs with a surface area, which cut-outs are separated from each other by portions of the conductive material, wherein carbon based sub-electrodes dimensioned so as to a least cover the surface area of the cut-outs are positioned in the cut-outs and are conductively connected to at least part of each of the portions of the conductive material adjacent to the carbon based sub-electrodes.

In such a carbon based electrode, because of the conductive integration, the over-all active electrode surface area will be formed by the combined surface areas of the individual sub-electrodes. Besides this, the conductive integration of the sub-electrodes into the frame ensures a good mechanical robustness. The present invention presents the advantage that the manufacturing process currently used for manufacturing the sub-electrodes can be maintained and needs not be adapted to render the sub-electrodes suitable for use with the present invention. Because the sub-electrodes are not positioned on top of a continuous supporting metal plate but rather fit in cut-outs or gaps in a supporting conductive frame or similar, the accessibility of both opposite sides of the active surface of the sub-electrodes is ensured and diffusion of reactant gasses to the catalytically active layer is permitted from both opposite sides of the sub-electrode. Thus, the individual catalytic activity of each of the sub-electrodes may at least be maintained.

In addition, depending on the arrangement of the sub-electrodes in the frame, homogeneous electrode properties may be ensured over the whole surface area of the large geometric surface area of the electrode and a uniform current density distribution. If so desired however, by a different arrangement of the sub-electrodes, electrode properties may be anisotropic as well, or they may vary over the electrode surface according to a desired pattern.

The present invention presents the advantage over state of the art solutions to the need for larger electrode areas of carbon based electrodes, where several electrodes are stacked in the direction perpendicular to the plane of the electrodes, to permit reducing the volume or space required for a reactor capable of processing large volumes of liquid per unit of time. When large volumes need to be processed per unit of time, the stacking approach results in a large space required for the installation and in large numbers of costly cell components and peripheral equipment. The present invention permits keeping such costs related to the large number of cell components an peripheral appliances required at a minimum.

The present invention provides a solution to the problem that a carbon based electrode with large geometric dimensions cannot simply be produced by linear expansion of the size of existing carbon based electrodes. This may be difficult to realise from a technical point of view, as homogeneous electrode properties need to be ensured over the entire surface of the electrode, and a sufficient mechanical and dimensional stability must be ensured regardless of the geometric dimensions which may rise to an order of 0.5 to 1 $m^2$. The present invention also solves the problem that a proper and uniform distribution of current density over the whole surface area of the electrode may be ensured—or a varying distribution of current density if so desired.

In order to minimize the risk to potential differences at the interface where the carbon based sub-electrodes are conductively connected to at least part of each of the portions of the conductive material adjacent to the carbon based sub-electrodes, a preferred embodiment of this invention is characterised in that each of the sub-electrodes contains a current density distributor, and in that the current density distributor of each of the sub-electrodes is connected to at least part of each of the portions of the conductive material adjacent to the carbon based sub-electrode containing the current density distributor.

In order to minimize the risk to the occurrence of potential differences at the interface where the carbon based sub-electrode is conductively connected to the frame of conductive material, the frame and the current density distributor of the sub-electrodes have an electric conductivity which differ to the smallest possible extent, but preferably are the same. With the frame and the current density distributor of the sub-electrode having an electric conductivity which differ to the smallest possible extent is meant that the electric conductivity of the frame may differ from the electric conductivity of the current density distributor by a maximum of 10%, preferably by 5%. This may in particular be achieved by a frame and current density distributor which are made of the same electrically conductive material.

The carbon based electrode of this invention is further characterised in that the frame is made of an electrically conductive material with an electrical resistance that is the same or smaller than the electrical resistance of the current density distributor of the sub-electrodes. This assures a uniform current density distribution over the whole surface area of the carbon based electrode with large geometrical surface area.

The present invention also relates to an electrochemical cell comprising at least one carbon based electrode with a large geometric surface area as described above. Often, the at least one carbon based electrode will function as the cathode.

The electrochemical cell according to the invention will usually besides the at least one cathode, further contain at least one anode. In order to increase power density and further improve the performance of the electrochemical cell, and in the case of a water purification installation to increase COD, an anode or an array containing several anodes, may be connected to two or more carbon based electrodes as described above to provide the anode. In a preferred embodiment, opposite sides of each anode are connected to a more carbon based electrodes as described above.

As the surface area of the cathode is often the limiting factor, in the electrochemical cell according to the present invention the cathode will preferably have an active surface which is at least 5 times larger than the active surface of the anode, preferably at least 10 times larger, more preferably at least 20 times larger or even more.

In order to improve the performance of the cathode, even with electrochemical cells with a larger volume, sub-electrodes of the carbon based electrode with large geometrical surface area which are located in a lower position in the electrochemical cell closer to a bottom of the electrochemical cell preferably have a smaller porosity than sub-electrodes of the carbon based electrode with large geometrical surface area which are located in a higher position in the electrochemical cell closer to an upper part of the electrochemical cell. According to another embodiment, different cathodes may be used in the bottom of the chamber where the water pressure is greatest, compared to cathodes at the top of the water chamber where there is much less of an impact of water pressure.

The carbon based electrode of this invention is suitable for use in a large number of applications, for example in electrochemical synthesis using carbon based electrodes, in electrochemical waste stream treatments using carbon based electrodes. The carbon based electrode of this invention is suitable for use as air cathode in a microbial fuel cell (MFC) for example for treating wastewater (in a pilot-scale MFC installation with a size ~1000 liters). In this application the cathode will be permeable to air on one side, impermeable to water on the other side, and demonstrate catalytic activity as described further below. In a preferred embodiment, the electrochemical cell further comprises at least one anode, wherein opposite sides of each anode are connected to a carbon based electrode as this permits improving power production as well as improving COD removal rate The present invention is further illustrated in the accompanying drawings and description of the figures.

FIG. 4 shows the cathode potential as a function of current density measured in the electrochemical cells of example 1 for the cathodes in the small (SC), medium (MC) and large chamber (LC) in (FIG. 4A) 50 mM PBS (6.25 mS cm$^{-1}$) and (FIG. 4B) tap water amended with NaCl (1.45±0.05 mS cm$^{-1}$).

FIG. 5 shows the cathode (Ct) potentials from the biotic polarization tests and the abiotic electrochemical tests of example 2 and anode (An) potentials from the biotic polarization tests in the (FIG. 5A) large and (FIG. 5B) small chamber, (FIG. 5C) Biotic power density curves in the small chamber (SC) and large chamber (LC) MFC, (FIG. 5D) Measured anode potentials, not corrected for the ohmic drop, in LC and SC and estimated in SC with an increased electrode spacing of 3.45 cm.

FIG. 6 shows the (FIG. 6A) cathode potentials (Ct) and anode potentials (An) with an anode module with 8 (projected area=0.25 m$^2$) and 22 anode brushes (projected area=0.60 m$^2$) compared with the abiotic chrono-potentiometry data and (FIG. 6B) correspondent power density curves, according to example 3.

The present invention relates to a carbon based electrode with a large geometrical surface area. With a carbon based electrode with a large geometrical surface area is meant according to the invention a carbon based electrode the geometrical surface area of which is at least a factor 4 larger than that of prior art carbon based electrodes, preferably at least a factor 5, more preferably at least a factor 10, most preferably at least a factor 50, in particular at least a factor 100 or even at least a factor 500 larger than existing carbon based electrodes.

Within the scope of the present invention, a carbon based electrode with a large geometrical surface area may also refer to an electrode having a length of at least 20 cm, preferably at least 30 or 40 cm, more preferably at least 50 cm, or at least 75 or even at least 100 cm, and a width of at least 20 cm, preferably at least 30 or 40 cm, more preferably at least 50 cm, or at least 75 or even at least 100 cm. It will be understood by the skilled person that length and width of the carbon based electrode may the same or different.

Within the scope of the present invention, a carbon based electrode with a large geometrical surface area may also refer to an electrode having a total surface area, i.e. including the surface area occupied by the frame, the frame portions and sub-electrodes, of at least 400 cm$^2$, preferably at least 900 or 1600 cm$^2$, more preferably at least 1000 cm$^2$, or at least 75 or even at least 100 cm, and a width of at least 20 cm, preferably ate least 30 or 40 cm, more preferably at least 50 cm, or at least 5500 cm$^2$ or even at least 10$^4$ cm$^2$.

The shape of carbon based electrode is not critical to this invention and may be selected by the skilled person taking into account any requirements imposed by its intended use. The carbon based electrode may have a regular or an irregular shape, symmetric or asymmetric. The carbon based electrode may for example have a mainly circular shape, it may be elliptical, rectangular, square or any other suitable shape.

Figure 1:
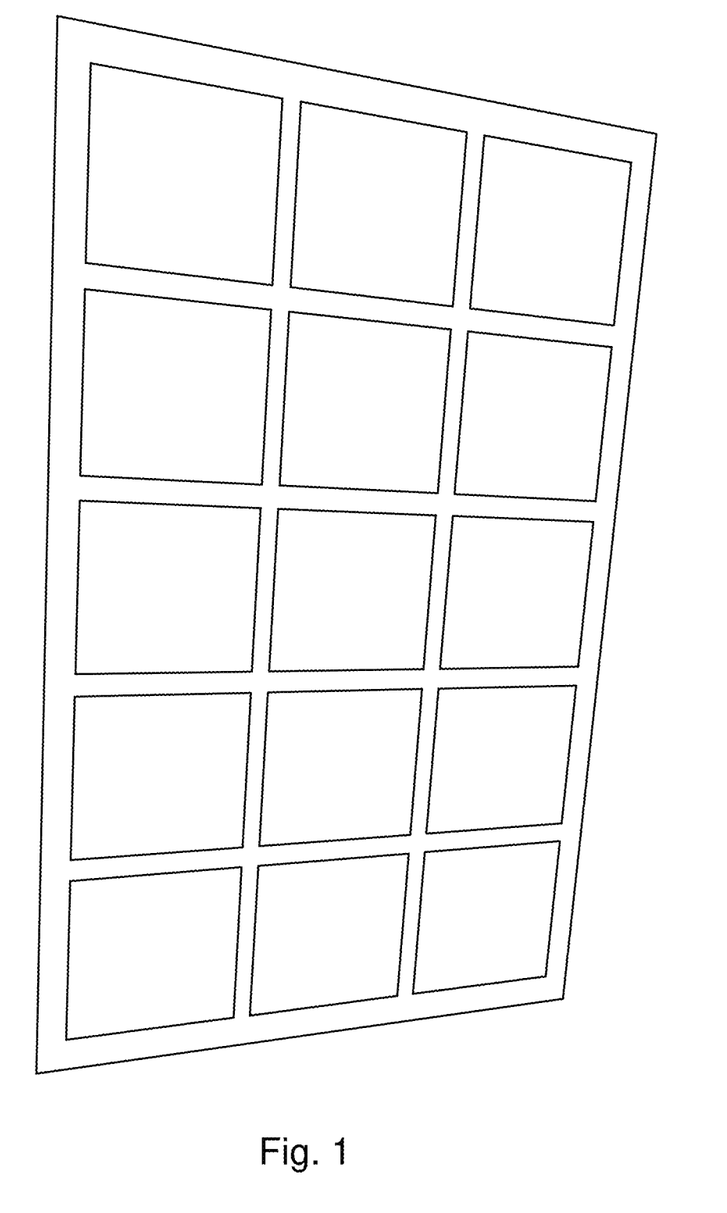
FIG. 1 shows a metal frame with 15 cut-outs for mounting 15 sub-electrodes therein.

As can be seen from FIG. 1, the carbon based electrode 1 of this invention comprises a frame 10 of an electrically conductive material wherein several cut-outs 20, 21, 22, 23 are provided. Such a frame may be obtained according to various ways well known to the skilled person, for example by appropriate shaping of the electrically conductive material into a frame, by removing parts from an electrically conductive sheet of plate, or by connecting portions of electrically conductive material in such a way that a frame 10 with several cut-outs is formed, or in any other suitable way.

Adjacent cut-outs are separated from each other by portions 11, 12 of the conductive material. Portions 11, 12 may be made of the same or of a different electrically conductive material, but preferably they are made of the same electrically conductive material. A circumferential edge of the carbon based electrode may comprise a circumferential frame 5, which may be made of the same material as the portions 11, 12 of electrically conductive material which is preferred or frame 5 may be made of a different material. Similarly, portions 11, 12 may be made of the same or of a different material. In order to keep the ohmic drop as small as possible, in other words to decrease the part of the resistance of the electrode imparted by the frame and to keep power output as high as possible, the distance between adjacent sub-electrodes is preferably kept as small as possible. This means in practice that the dimensions of the portions of the conductive material present between the cut-outs are kept as small as possible. The dimensions of the frame and the portions of conductive material between the cut-outs are preferably selected such that the geometric surface area occupied by them is smaller than 30% of the total geometric surface area of the electrode, more preferably smaller than 25%, most preferably smaller than 20%, in particular smaller than 15% or even smaller than 10%. This will also permit increasing the portion of active electrode surface area in relation to the total surface area of the electrode.

The number of cut-outs is not critical to the invention and it may be selected and varied by the skilled person taking into account the surface area of each individual cut-out and the electrochemical performance to be achieved by the electrode. Electrochemical performance is understood to also refer to the potential shown by or voltage produced or voltage output or power density by the electrode at a certain current density.

The shape of the cut-outs is not critical to the invention either and it may be selected and varied by the skilled person taking into account the shape of the frame 10 of the electrically conductive material. The cut-outs 20, 21, 22, 23 may be arranged within the frame 10 in a random manner, but preferably they are arranged according to a regular geometric pattern to ensure a distribution of the current over the electrode which is as homogenous as possible. The dimensions of the cut-outs are not critical to the invention either, in as long as they do not adversely affect the mechanical and dimensional stability of the sub-electrodes mounted therein. The dimensions of the cut-outs will preferably correspond to the dimensions of conventional carbon based electrodes, in particular gas diffusion carbon based electrodes, frequently used in the art. Suitable dimensions are, without being limited thereto, a width of about 5 to 50 cm, and a length of about 5 to 50 cm, 20×20 cm being a frequently used size. Preferably, in each cut-out a sub-electrode is mounted.

The carbon based electrode of this invention electrode may either be employed as an anode or a cathode, but preferably is used as a cathode.

Figure 3:
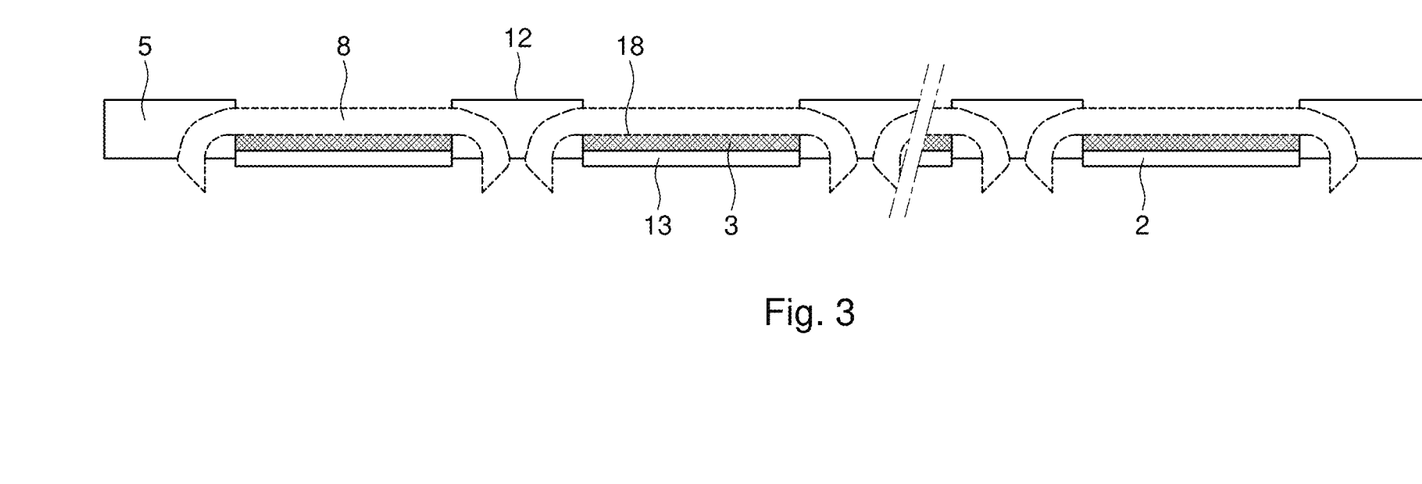
FIG. 3 shows a cross section in thickness direction of the electrode of this invention.

A carbon based sub-electrode suitable for mounting in the frame of electrically conductive material as described above, usually comprises one or more current density distributors 8, with a layer of an electrochemically active or catalytically active material on a carbon support 3 embedded in a porous polymer matrix and arranged to one side 18 or face of the current density distributor. If so desired, on top of the catalytically active layer, a water repellent layer 13 or hydrophobic gas diffusion outer layer may be added, which allows diffusion of reactant gasses to the catalytic reactive layer while preventing the electrolyte from leaking out of the electrolyte chamber through the electrode. These electrodes are tailored for use in those electrochemical cells where anode and cathode are separated by a free electrolyte liquid phase (e.g.: aqueous reaction medium, wastewater streams).

"Water Repellent Layer" (WRL) or hydrophobic gas diffusion layer 2, is understood to comprise a layer of a hydrophobic material having an external surface in contact with gas and showing porosity to the gas and the ability of preventing leakage of an aqueous electrolyte into the gas diffusion layer. "Electrochemically Active Layer" (EAL) is a layer in which the electrochemical reaction takes place having high electrical conductivity and porosity to gas and electrolyte and having an interface with electrolyte on one surface and a water repellant (hydrophobic gas diffusion) layer on the other.

Either the entire face of the current density distributor 8 may be covered with the EAL and the WRL respectively or only part of it. In order to ensure optimum connection of the sub-electrode to the frame of electrically conductive material, it may be desirable to leave a circumferential band 15 of the sub electrode free of catalytically active material and hydrophobic material and therewith provide each sub-electrode with a connection area. The dimensions of this band 15 in width direction of the band are preferably such that a liquid tight connection to the portions of the conductive material adjacent to the sub-electrodes and the frame may be ensured in order to minimize the risk to the occurrence of cross contamination, for example leakage of reactant from one side of the electrode to the other side. This is of particular importance when the sub-electrodes are gas diffusion electrodes, which are typically composed of a hydrophilic catalytically active layer one side of the current density distributor and a porous hydrophobic gas diffusion layer permeable to gas and impermeable to liquid on the opposite side of the current density distributor. When in use in an electrochemical reactor, the electrodes of this invention function to separate different electrolytes from each other, at either side of the active layers of the sub-electrodes.

A liquid tight connection between the sub-electrodes, preferably the circumferential band, and the relevant portions of electrically conductive material of the electrically conductive frame may be achieved according to various methods known to the skilled person. Particularly suitable methods include welding or soldering, as those techniques permit establishing a mechanically strong connection, with a good resistance to pressure and a minimal risk to creating a potential difference over the connection between the sub-electrodes and the portions of the electrically conductive frame. Other liquid tight connections may be achieved by the presence of a sealing material along the circumferential edge of the sub-electrodes, which holds the sub-electrode in the cut out in a liquid tight manner, for example a rubber gasket.

A suitable example of a current density distributor for use within the sub-electrodes of the present invention is disclosed in US2016/0010227. The preferred current density distributor may take the form of a porous mesh, for example a woven, knitted or braided material, porosity being provided by the pores between the woven—knitted or braided fibers. The current density distributor may also take the form of a web, net, plate, sheet, foil, film or screen, with pores provided therein for example using photochemical etching or electro forming. The current density distributor may be made of a wide variety of electrically conductive materials, for example of metal, a metal-plastic combination, a mixed metal type, a mixture of metal and other non-metallic conductive (such as conductive polymers and conductive carbon e.g. graphite, graphene and carbon nano-tubes), and any combination thereof. Particular examples of electrically conductive material suitable for use with this invention include intrinsically conductive polymers (ICP's), metal alloys. Preferred electrically conductive materials include stainless steel alloys, more preferably austenitic stainless steels and duplex stainless steel because of its high yield strength and stress corrosion cracking resistance to chloride, when compared to austenitic stainless steels. Austenitic stainless steels and duplex stainless steel are preferred because of their good corrosion resistance, and minimal magnetic properties. The dimensions of a particular current density distributor are preferably adapted to the dimensions of the cut-out into which it is to be mounted. The dimensions of the current density distributor may be selected such that it fits in a particular cut-out. Alternatively the dimensions of the current density distributor may be selected such that some overlap is provided of the edges of the current density distributor and the edges of the cut-out into which it is mounted, to facilitate mounting and liquid tight connection.

Figure 2:
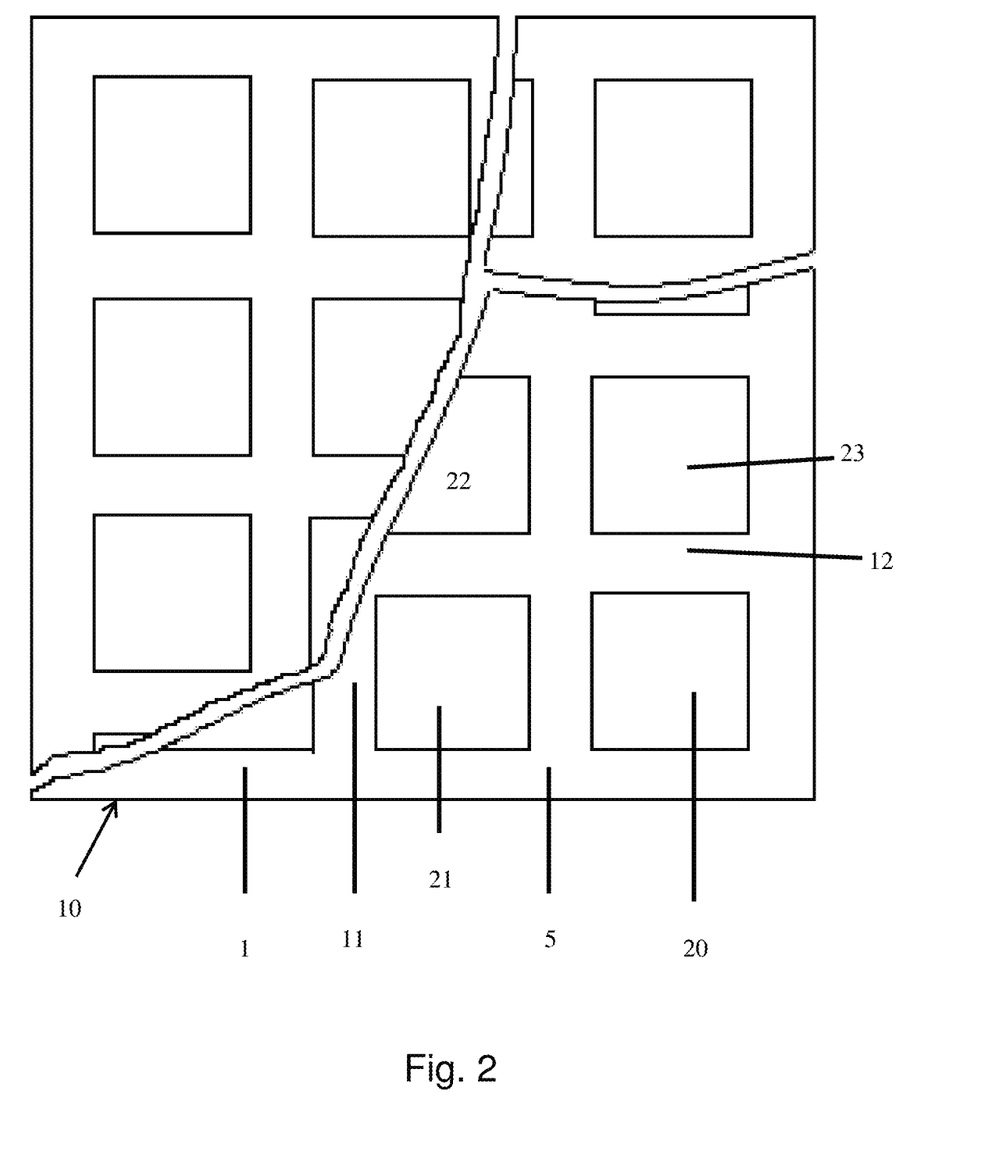
FIG. 2 shows a schematic representation of a frame with cut-outs for mounting sub-electrodes therein.

As has been described above and is shown in FIG. 2, the carbon based electrode 1 of this invention comprises a frame 10 of an electrically conductive material wherein several cut-outs 20, 21, 22, 23 are provided. Preferably in each cut-out a carbon based sub-electrode as described above is mounted in a liquid tight manner. Thereby, all sub-electrodes may be the same. Within the scope of this invention however, sub-electrodes in different parts of the frame may be different as well. This may be of particular interest if use is made of electrochemical cells with a large volume, wherein a substantial pressure difference exists between an upper part of the cell or chamber and a lower part in the vicinity of the bottom of the cell or chamber. In the case of large volume cells, it may be preferred to provide in a lower part of the frame sub-electrodes with a smaller porosity, and to provide in an upper part of the frame sub-electrodes with a higher porosity.

The invention is further illustrated in the examples below.

Materials and Methods

Electrode Materials.

Several cathodes with varying dimensions (18×18 cm, 324 cm$^2$, 0.45 mm thick) were produced using sheets manufactured by VITO (Mol, Belgium), using a proprietary process based on pressing together a mixture of AC (70-90 wt %; Norit SX plus, Norit Americas Inc., TX) and polytetrafluoroethylene (PTFE) binder, onto a stainless steel mesh current collector. A PTFE diffusion layer (70% porosity) was then added on top of the catalytically active layer containing the catalyst which became the air-side of the cathode.

Sub-cathodes for small (11.3 cm$^2$) and medium (52 cm$^2$) chambers were made from portions cut from these sheets. A circular cathode 3.8 cm in diameter (11.2 cm$^2$) was used for the smallest reactor (0.028 liter), and a rectangular cathode of 9.2×5.6 cm (52 cm$^2$) was used in a medium size reactor (0.22 liter). The large cathode (107 cm long by 64 cm in height, 0.68 m$^2$) contained 15 sub-cathodes which had been welded to one single stainless steel panel cut with 15 holes to provide the frame. The cathodes were exposed to water on one side, and air on the other side. The use of a single metal panel enabled obtaining a low electrical resistance of <0.2Ω between the center of each sub-cathode and any other part of the external stainless steel panel.

Brush anodes were made with two different sizes for the different sized-chamber MFC tests. For the smaller reactor, brushes were 2.5 cm in diameter and 2.5 cm long, and made from graphite fiber (PANEX 35 50K, Zoltek) wound between two titanium wires (Mill-Rose, Mentor, OH). The brushes used in the larger reactor were 5.1 cm in diameter and 61 cm long, made from the same materials as the smaller brushes (Gordon Brush, CA, USA). All anodes were heat treated at 450° C. in air for 30 min prior to use in MFCs.

Bench and Pilot-Scale Reactors

Three different electrochemical cells were constructed to evaluate the impact of scaling up the cathode size on the electrochemical performance (Table 1). The smaller cell (SC) was a single chamber, cube-shaped reactor constructed from a polycarbonate block 4 cm in length (5 cm×5 cm), with an inside cylindrical chamber having a diameter of 3 cm (0.028 liter total volume), and an exposed cathode area of 7 cm$^2$ (Table 1) that has been used in many previous MFC laboratory studies). The cathode specific surface area was 25 m$^2$ m$^{-3}$-anolyte volume.

TABLE 1

Basic specifications of three different sized test chambers

| | Small chamber (SC) | Medium chamber (MC) | Large chamber (LC) |
| --- | --- | --- | --- |
| Liquid volume (L) | 0.028 | 0.22 | 85 |
| Cathode exposed surface area (cm$^2$) | 7 | 33 | 6220 |
| Cathode specific surface area (m$^2$/m$^{-3}$) | 25 | 15 | 7.3 |

The medium-sized cell (MC) was a polycarbonate rectangular-shaped reactor, with an anolyte chamber 10.9 cm long, 3.5 cm wide, and 6.2 cm high, filled with 0.22 liter of electrolyte. The cell had a bracket slot 3.5 cm from the wall of the water side, where the cathode was attached separating the anolyte chamber from the air cathode chamber. The cathodes were secured to the frame with screws using a plastic U-shape fastener and a gasket (butyl rubber). The air chamber was 6.8 cm long, 1.0 cm wide and 4.4 cm high.

The large cell (LC) was a specially-designed tank (1.1 m long, 0.15 m wide and 0.85 m height) that was used to examine the physical properties of the cathodes, such as mechanical strength (deformation when filled) and the resistance to water pressure (based on leaking), as well as to evaluate the electrochemical characteristics of the cathodes. The tank had a bracket slot 10 cm from the wall of the water side, where the cathode was attached to form the anolyte chamber. The cathodes were secured to the frame with screws using a plastic U-shape fastener and a gasket (Closed Cell PVC vinyl foam). The anolyte tank was filled with 85 liter of water, and examined by eye for deformation and water leakage when filled. The cathode specific surface area was 7.3 m$^2$ m$^{-3}$-anolyte volume. This lower specific area of the cathode permitted to accommodate the larger diameter anode brushes and provide ample room for moving the reference electrode within the chamber. The cathode air chamber was formed by sliding sheet of PVC into a slotted grove 5 cm from the cathode. To reduce the cathode deformation caused by water pressure, the space between the clear PVC sheet and the cathode was filled with 19 spacers[32], constructed by rolling polypropylene mesh (XN3110-48P, Industrial Netting, USA) into tubes 4-cm diameter tubes 1 m long, with the rolled tubes held together using zip ties.

To examine actual power generation in the large chamber, an anode module made of polyvinyl chloride (PVC) was constructed using a linear array of graphite fiber brushes. The PVC module held either 8 or 22 brushes (as indicated), with the ends of the brushes secured at the top and at the bottom of the module. The brush modules was placed parallel to the cathode, in the middle of the anode chamber, producing a distance between the edge of the anode brushes and the cathode of 3.45 cm in initial tests. The anodes were connected in parallel to the circuit by an external single titanium wire. At the top of the anode module, a clip was used to reduce the bending of the cathode sheet and to secure it in position and improving electrical connections. For the smaller chamber, the anodes were placed horizontally in the middle of MFC chambers (perpendicular to the cathode) with a distance of 1.4 cm between the edge of the brush and the cathode.

In order to avoid any short circuiting, and to reduce biofilm growth on the cathode, all reactors were operated with a separator placed on the cathode. (PZ-1212, Contec, USA).[34,35] For the small chamber a separator with the same area of the cathode was cut from a 30 cm by 30 cm wipe separator (PZ-1212, Contec, USA). In the large chamber 12 separators were sewed together and cut to the final area, same as the cathode (0.68 m$^2$).

Electrochemical tests were performed using a potentiostat (VMP3, BioLogic, Knoxville, TN) with the cathode as the working electrode (WE), and steel mesh as the counter electrode (CE) in the medium and large chamber reactors and Pt mesh as the CE in the small chamber. Electrochemical performance of the cathodes was evaluated using chronopotentiometry (CP) tests in a 50 mM phosphate buffer solution (PBS; Na2HPO4, 4.58 g L-1; NaH2PO4·H2O, 2.45 g L-1; NH4Cl, 0.31 g L-1; KCl, 0.13 g L-1; pH 7.0; conductivity of κ=6.25 mS cm-1) or sodium chloride amended tap water (κ=1.45±0.05 mS cm-1) in the presence or absence of the separator. Current was fixed for 20 minutes over a range of 0 to −4 mA in the small reactors, 0 to −10 mA in the medium chamber, and 0 to −0.4 A in the large chamber. An Ag/AgCl reference electrode (RE-5B, BASi, West Lafayette, IN; +0.209 V vs. SHE) was used in the SC and MC electrochemical tests, and placed 1.15 cm from the cathode. The ohmic losses due to the distance between the RE and the WE were corrected based on the conductivity of the solution (see information in SI and FIGS. 4C and 4D). An immersion reference electrode (AGG, Electrochemical Devices Inc., OH; +0.199 V vs. SHE) was used in the large chamber and kept close to the cathode, in the same position for all the tests. All potentials were reported versus SHE.

Microbial Fuel Cell (Biotic) Tests

The anodes in the SC reactors were fully pre-acclimated to wastewater in MFCs for over four months at a fixed external resistance of 1000Ω, at a constant temperature (30° C.). Domestic wastewater was collected once a week from the effluent of the primary clarifier at the Pennsylvania State University Waste Water Treatment Plant, and stored at 4° C. prior to use. Single cycle polarization tests were conducted by varying the external resistance from 1000, 500, 200, 100 and 75 at a 20 min interval after open circuiting for 2 h with a total test duration of 3.7 h, in a constant temperature room (30° C.).

The LC MFC was operated at room temperature and directly fed with fresh primary effluent wastewater. During acclimation of the anodes for the first week of operation, the feed solution was 35 L of primary effluent wastewater mixed with 40 L of 0.5 g L$^{-1}$ sodium acetate in 50 mM PBS, and 10 L effluent collected over several weeks from MFCs fed acetate and wastewater. The external resistance was 1000Ω for the first two days and then was decreased daily to 100Ω, 25Ω, 10Ω and 5Ω. For the second week of acclimation, the solution was 55 L of wastewater, 20 L of 50 mM PBS containing 0.5 g L$^{-1}$ sodium acetate, and 10 L of MFC effluent. Thereafter, the LC MFC was operated using only primary effluent. After a stable cycle of voltage production for three successive fed-batch cycles, single cycle polarization tests were conducted with the LC MFC by feeding the reactor with fresh wastewater and holding the system at open circuit conditions for 2 h, and then varying the external resistance from 100, 25, 10, 5, 2, 1 to 0.4Ω at a 20 min intervals.

The current was calculated based on the voltage drop (U) across the external resistor, and recorded using a computer based data acquisition system (2700, Keithley Instrument, OH). Current densities (i) and power densities (P) were normalized to the total exposed projected cathode area (large chamber area, ALC=0.62 m$^2$, and power PLC; small chamber area, ASC=7 cm$^2$, and power PSC), and calculated as i=U/RA and P=iU, where R is the external resistance. During each polarization test, anode and cathode potentials were also recorded using a reference electrode. An Ag/AgCl reference electrode (RE-5B, BASi, West Lafayette, IN; +0.209 V vs. SHE) was used to measure the anode potential (EAn) in the small chamber (SC) biotic tests at a distance of 1.15 cm from the cathode. The cathode potential (ECt) was calculated from the anode potential and the cell voltage as ECt=U+EAn, and then corrected based on the conductivity of the solution and the distance from the RE (see information in SI and FIGS. 4C and D). An immersion reference electrode (AGG, Electrochemical Devices Inc., OH; +0.199 V vs. SHE) was used in the large chamber (LC) biotic tests to measure the cathode potential (ECt), and it was kept close to the cathode, and in the same position for all the tests. The anode potential (EAn) was estimated using the cell voltage as EAn=U−ECt, and then corrected based on the conductivity of the solution and the distance from the RE (see information in SI and FIGS. 4C and D).

Figure 4A:
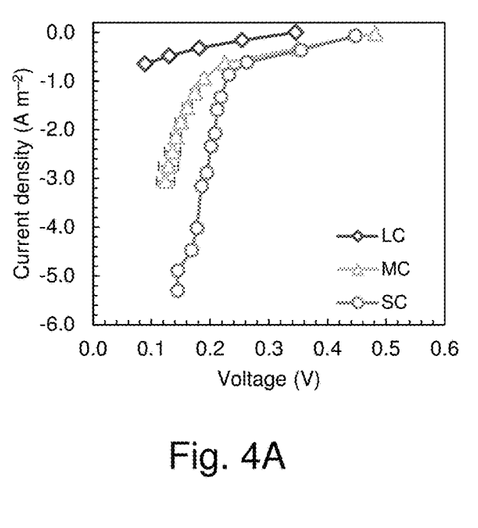
Figure 4B:
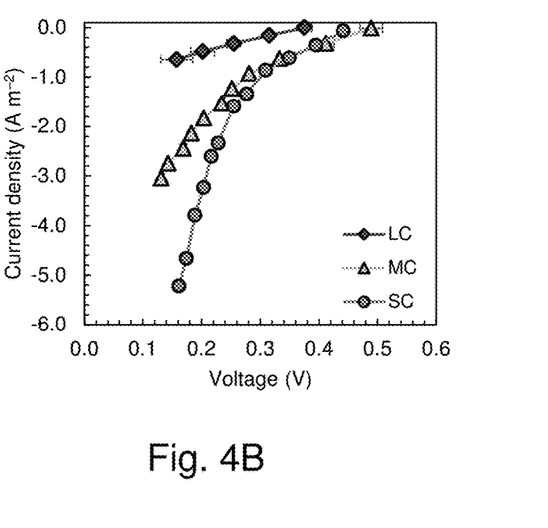
Figure 4C:
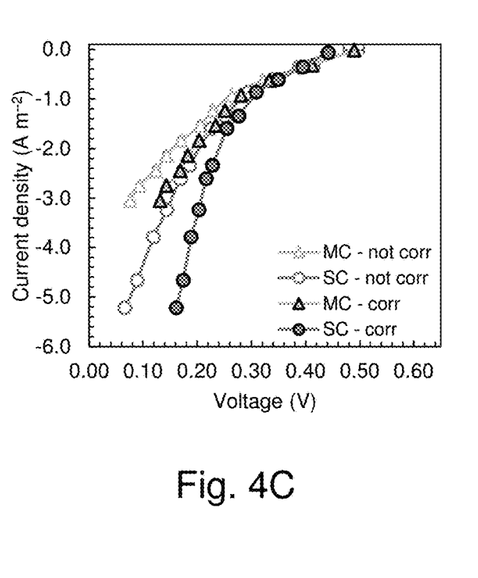
FIGS. 4C and D show corrected (corr) and not corrected (not corr) cathode potential as a function of current density measured in the electrochemical cell for the cathodes in the small (SC) and medium chamber (MC) in (FIG. 4C) 50 mM PBS (6.25 mS cm-1) and (FIG. 4D) tap water with NaCl (1.45±0.05 mS cm-1) with an electrode spacing (d_(WE-RE)) of 1.15 cm.
Figure 4D:
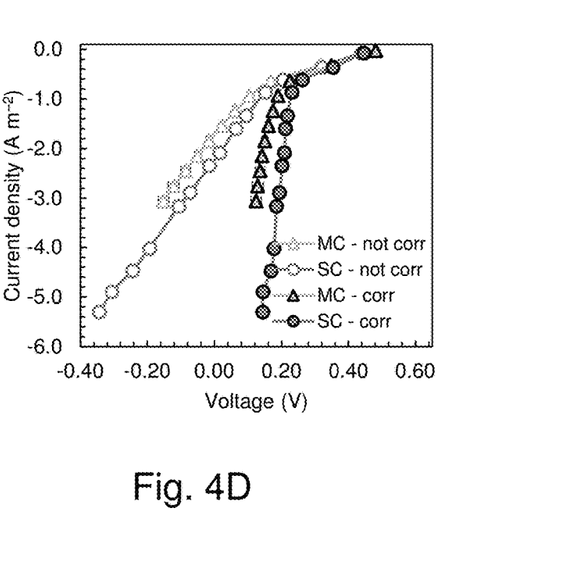

Chrono-potentiometry tests on cathodes of different sizes showed differences in performance, with the smaller cathodes producing the lowest over-potentials at the different set current densities (FIG. 4A, FIGS. 4C and D). For example, at 0.61±0.00 A m$^{-2}$ the small cathode produced 0.35±0.00 V, which was only 5% higher than the voltage produced by the middle-sized cathode (0.33±0.00 V at 0.62±0.01 A m$^{-2}$) but 118% higher than that obtained with the large cathode (0.16±0.03 V at 0.64±0.00 A m$^{-2}$). The adverse impact of increased size of an electrode on performance was consistent with previous studies that showed a loss in power as cathode sizes were increased.

EXAMPLES

Example 1

Chrono-potentiometry tests were conducted on the different size cathodes in tap water amended with sodium chloride (κ=1.45±0.05 mS cm-1), to evaluate performance in an unbuffered solution with a conductivity similar to that of domestic wastewater (FIG. 4B). The over-potentials of all cathodes were larger in the less conductive solution, with the large cathode having much higher over-potentials in respect to the other two cathodes at a given current density. The large cathode voltage at a current density of 0.64 A m$^{-2}$ was 0.09±0.01 V, compared to 0.23±0.00 V of the medium size cathode at 0.63±0.00 A m$^{-2}$ and 0.26±0.01 V at 0.62±0.00 A m$^{-2}$ of the smaller cathode.

Additional chrono-amperometry tests were conducted using the large chamber to evaluate the impact of the presence of the separator on the electrochemical performance of the cathode over a current density range relevant to operation of the larger MFC using wastewater (FIG. 4C). The presence of the extra layer of the wipe reduced the voltage output at 0.64 A m-2 from 0.16±0.03 V to 0.13±0.01 V in PBS, and from 0.09±0.01 V to 0.06±0.00 V in a low conductivity solution. Insufficient airflow in the cathode chamber could reduce oxygen availability and cathode performance. Therefore, an additional electrochemical test was conducted by blowing air into the bottom of the air chamber at 0.5 Lpm (FIG. 4D). This airflow across the cathode did not impact the cathode performance, indicating that the size of the air chamber was sufficient to passively provide oxygen transfer to the cathode.

Example 2. Power Production of the 85 L MFC Fed Domestic Wastewater (22 Anodes)

Figure 5A:
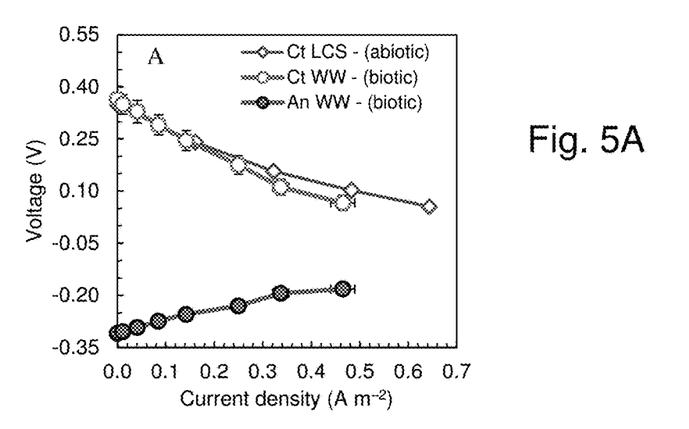
Figure 5B:
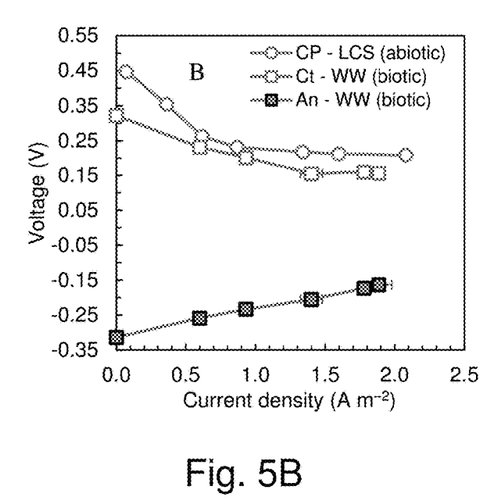
Figure 5C:
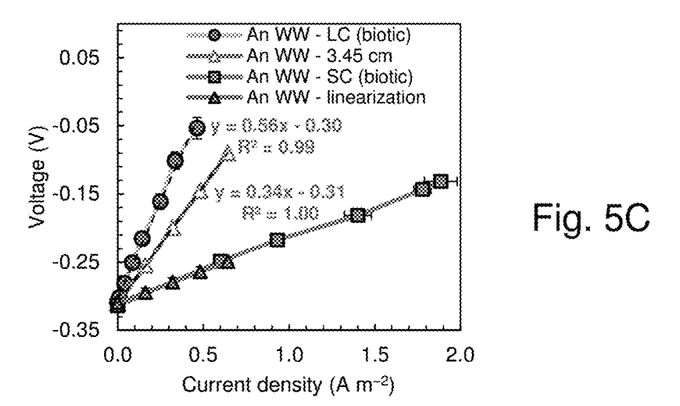
Figure 5D:
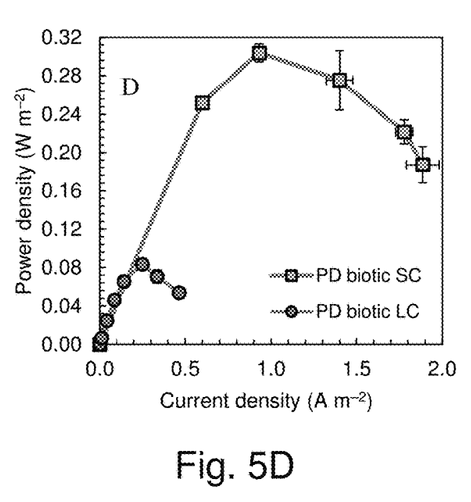
Figure 5E:
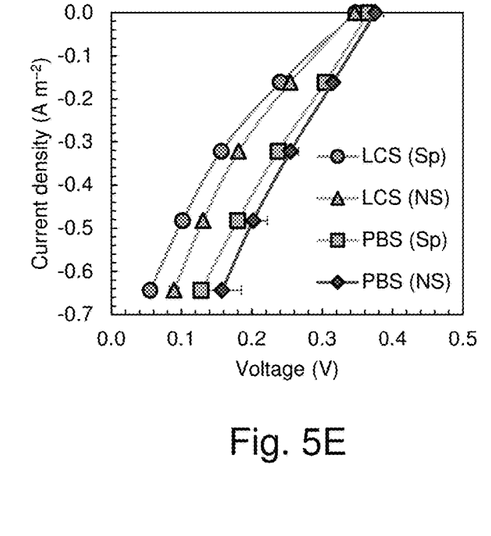
FIG. 5E shows chronopotentiograms of cathodes in the large (85 L) chamber in 50 mM PBS and in tap water amended with NaCl (LCS) in the presence (Sp) and the absence (NS) of the separator.
Figure 5F:
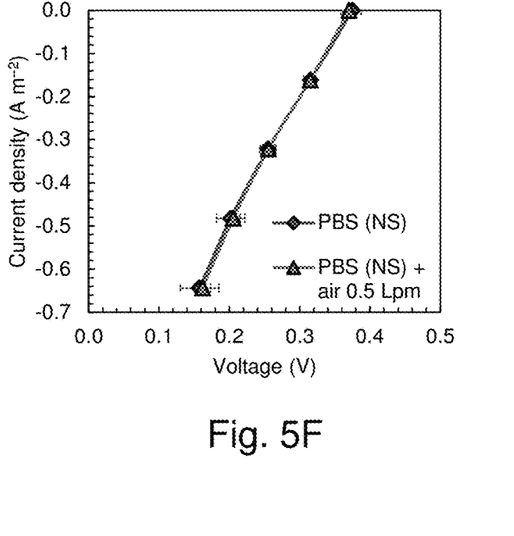
FIG. 5F shows chronopotentiograms of cathodes in the large (85 L) chamber in 50 mM PBS in the absence (NS) of the separator, and by blowing additional air through the air chamber at a flowrate of 0.5 liters per minute (air 0.5 Lpm).

Following acclimation of the 85 L MFC with the anode module over three fed-batch cycles, 13 polarization tests were conducted using domestic wastewater). The maximum power density was 0.083±0.006 W m$^{-2}$, which was 73% lower than that obtained in the small chamber MFC (0.304±0.009 W m$^{-2}$ in wastewater). The cathode potentials were similar in the abiotic and biotic tests in the 85 L and in the 28 mL reactors (FIGS. 5A and 5B). There was a significant difference between the OCV of the biotic (0.32±0.00 V) and abiotic (0.44±0.00 V) tests for the small chamber, but the cathode potentials matched well over the current density range relevant to operation of wastewater fed MFCs. The anode performance was a factor in the reduced power production by the large MFC compared to the small MFCs. Correcting the anode potential in the small chamber for the larger electrode spacing (3.45 cm in LC and 1.4 cm in SC) resulted in anodic performance higher that that registered from the biotic test in the LC (see information in FIGS. 5E and F). For example, the slope of the trendline from the linearization of the anode potential was 0.56 Ωm-2 in LC biotic test, 65% higher than the 0.34 Ωm$^{-2}$ from the correction of the SC biotic test for the larger electrode spacing (FIG. 5D). However, there was a much larger reduction in the cathode performance (change of |0.30 V|, from 0.37±0.04 V at OCV to 0.07±0.02 V at 0.46±0.03 A m$^{-2}$) compared to that of the anodes (change of |0.13 V|, from −0.31±0.01 V at OCV to −0.18±0.02 V at 0.46±0.03 A m$^{-2}$). This larger difference for the cathode indicated that in this system the cathode was primarily limiting the power production. The decrease in the anode performance was likely a result of both increased sizes of the anodes and cathode performance. The anodes in the 85 L MFC were much longer, and had a larger diameter, than those in the small MFC, which both could have contributed to higher over-potentials. The increase in water pressure could also have decreased the performance of the cathodes, particularly at the bottom of the MFC where the water pressure was highest, relative to those at the top of the reactor. This change in the cathode performance could have impacted performance of the anodes opposite to the cathode in the bottom of the large reactor. The reduced active area of the cathode due to the metal frame could also have been a factor in reducing anode performance, as the metal frame accounted for 23% of the exposed projected area of the cathode. Normalizing the power produced by only the active cathode area would produce a power density of 0.10 W m$^{-2}$.

Figure 6A:
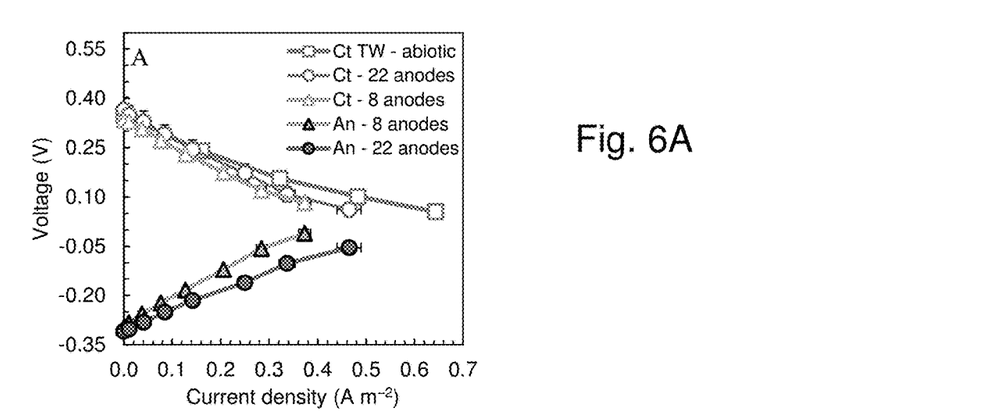
Figure 6B:
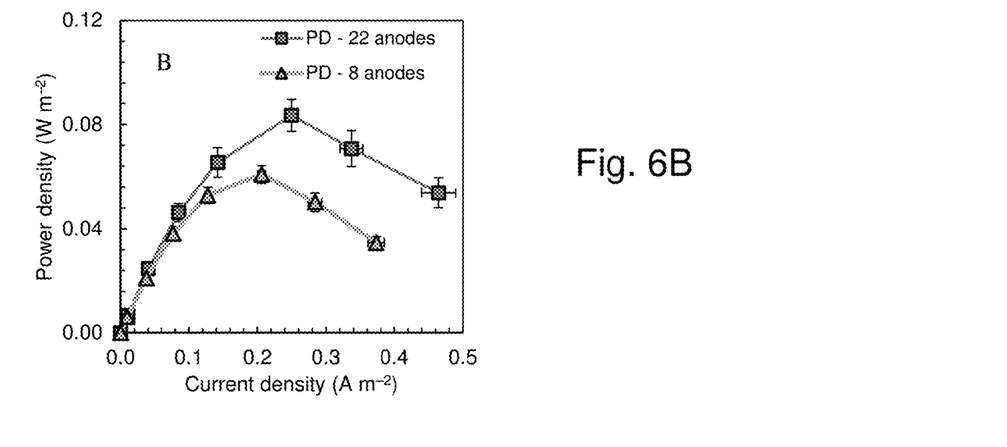

Example 3. Power Production of the 85 L MFC Fed Domestic Wastewater Using 8 Anodes To further examine the impact of the anodes on performance, tests were conducted using 8 anodes instead of 22 anodes. Reducing the number of anodes decreased the anodic projected area by 58% (from 0.60 m2 to 0.25 m2), but this decreased the maximum power density by only 27%, from 0.083±0.006 W m$^{-2}$ to 0.061±0.003 W m$^{-2}$ based on the cathode projected area (FIG. 6). Power normalized to the projected anode area was 0.152±0.009 W m$^{-2}$, which is consistent with previous results showing a larger cathode area improves the relative performance of the cathode. Reducing the number of anodes resulted in slightly increased anode over-potentials. For example, the anode potential at the maximum power density with 8 anodes was −0.121±0.002 V at 0.206±0.006 A m$^{-2}$ (normalized to the cross-sectional or projected cathode area) compared to −0.16±0.01 V at the highest current density of 0.250±0.006 A m$^{-2}$ with 22 anodes. Thus, maximizing full coverage of the cathodes by the anodes will permit to improve power production.[37]

Example 4. Power Production Using 22 Anodes

The MFC with 8 or 22 anodes achieved similar COD removal efficiencies of 75-80%. The presence of a higher number of anodes therefore did not increase the rate of COD removal, although the number of anodes did impact the amount of COD converted to electricity. The coulombic efficiency 38 CE was 27% when using 22 anodes, but it decreased to 13% with 8 anodes.

Example 5. Influence of Electrode Spacing

In examples 1-4 use was made of a 3.45 cm electrode spacing. The solution resistance in the large chamber with a 3.45 cm electrode spacing was 0.47Ω, which was 21% of the internal resistance of the reactor (2.19Ω). Reducing the spacing from 3.45 cm to 1.4 cm could decrease the internal resistance of 60%, to 0.19Ω, and raise the maximum power density.

Example 6

A cathode was manufactured to include a 316L stainless steel mesh current density distributor and an activated carbon catalyst with specifications described below:
Current density >0.3 A/m2 using 50 mM phosphate buffer and acetate as fuel.
Maximum power density >100 mW/m2 using 50 mM phosphate buffer and acetate as fuel.
Water pressure resistance: will not show visible leaks at a water head pressure of >3 ft (>1 m).
Full-scale manufactured cathode performance (current density, power density, and maximum water pressure resistance) variability ≤10%.
The cathode sheets meet the demonstration reactor dimensional requirements (1.07 m wide×0.64 m long).
Step 1: manufacture of 15 VITO CoRE® gas diffusion electrodes (20*20 sqcm). Each single electrode has the following characteristics:
flat sheet, rectangular, PSA max 20×20 cm, total thickness ca 0.07 cm
With hydrophobic gas diffusion outer layer (white layer in the below picture);
Active layer (mesh layer: based on activated carbon; ratio activated carbon:ptfe black layer 80:20
Current density distributor: stainless steel 316L, wire diameter 0.02 cm, mesh opening 0.045 cm, supplied by Solana; 200×200 mm
Step 2: realisation of an electrically conducting metal frame for the assembly of the electrodes using a stainless steel 316L plate from TESTAS, Belgium of 1070×640 mm$^2$. The spaces for mounting the carbon based electrodes were laser cut from the metal plate, which was made of the material as the conductive current density distributor of the individual electrodes above also stainless steel 316L. The metal frame and the metal mesh for the current density distributor of the electrodes consist of the same metal; the thickness of the metal frame is 2.5 times the thickness of the wires forming the metal mesh. The conductivity of these materials was be the same, but the frame had a lower electrical resistance than the electrically conductive current density distributor present within the sub-electrodes, due to the larger thickness of the frame.

Step 3: Assembly of the Gas Diffusion Electrodes onto the Metal Frame

This is done by laser welding to the metal frame the edges of the metal gauze or mesh of the GDEs. The overall thickness of the assembly is not larger than the thickness of a single electrode.

To achieve that the composed thin plate electrode is liquid tight, the welded connection between the conductive frame and the (sub)electrodes is sealed. This may be done by applying sealing material around the welding edges to ensure tightness of the assembly. Two component glue (MacroPlast from Loctite) was applied at the seams/jointures on the white layer side (gas feed side), it is allowed to dry for 2 days.

The invention claimed is:

1. A carbon based electrode with a large total geometrical surface area of greater than 400 cm$^2$, the electrode comprising a frame of an electrically conductive material with multiple cut-outs with a surface area, which cut-outs are separated from each other by portions of the electrically conductive material, wherein carbon based sub-electrodes dimensioned so as to at least cover the surface area of the cut-outs are positioned in the cut-outs and are conductively connected to at least part of each of the portions of the electrically conductive material adjacent to the carbon based sub-electrodes, wherein each of the sub-electrodes contains a current density distributor, wherein the frame has an electric conductivity which differs from the electric conductivity of the current density distributor by a maximum of 10% and/or wherein the frame has an electrical resistance which is the same as or smaller than the electrical resistance of the current density distributor.

2. The carbon based electrode according to claim 1, wherein the current density distributor is connected to at least part of the portions of the electrically conductive material adjacent to the carbon based sub-electrode containing the current density distributor.

3. The carbon based electrode according to claim 2, wherein the electric conductivity of the frame is the same as the electric conductivity of the current density distributor.

4. The carbon based electrode according to claim 1, wherein the carbon based sub-electrodes fit into the cut-outs in a water tight manner.

5. The carbon based electrode according to claim 4, wherein a sealing material is applied to the connection of the sub-electrode to the frame.

6. The carbon based electrode according to claim 1, wherein the frame of the electrically conductive material is made of metal.

7. The carbon based electrode according to claim 1, wherein the carbon based electrode is a gas diffusion electrode.

8. The carbon based electrode according to claim 1, wherein the dimensions of the frame and the dimensions of the portions of the electrically conductive material between the cut-outs are selected such that the geometric surface area of the portions of the electrically conductive material between the cut-outs occupies at most 30% of the total geometric surface area of the electrode.

9. The carbon based electrode according to claim 1, wherein sub-electrodes located in a first part of the electrode have a smaller porosity than sub-electrodes located in a second part of the electrode.

10. An electrochemical cell comprising at least one carbon based electrode according to claim 1.

11. The electrochemical cell according to claim 10, further comprising at least one anode, wherein opposite sides of each anode are connected to one of the at least one carbon based electrode.

12. The electrochemical cell according to claim 11, wherein the at least one carbon based electrode functions as a cathode and has an active surface which is at least 5 times larger than the active surface of the anode.

13. The electrochemical cell according to claim 10, wherein sub-electrodes of the carbon based electrode with geometrical surface area which are located in a lower position in the electrochemical cell closer to a bottom of the electrochemical cell have a smaller porosity than sub-electrodes of the carbon based electrode with geometrical surface area which are located in a higher position in the electrochemical cell closer to an upper part of the electrochemical cell.

14. The electrochemical cell according to claim 10, wherein the electrochemical cell is a cell for electrochemical synthesis, an electrochemical waste water treatment cell, or a microbial fuel cell.

15. The carbon based electrode according to claim 1, wherein current density distribution over the whole geometrical surface area of the carbon based electrode is uniform.

* * * * *